INVENTOR
Willard A. Derr.

INVENTOR
Willard A. Derr.
BY
ATTORNEY

June 24, 1958  W. A. DERR  2,840,797
SUPERVISORY CONTROL SYSTEMS AND APPARATUS
Filed Aug. 14, 1952  16 Sheets-Sheet 4

INVENTOR
Willard A. Derr.
BY
ATTORNEY

INVENTOR
Willard A. Derr.

INVENTOR
Willard A. Derr.

June 24, 1958 W. A. DERR 2,840,797
SUPERVISORY CONTROL SYSTEMS AND APPARATUS
Filed Aug. 14, 1952 16 Sheets-Sheet 8

INVENTOR
Willard A. Derr.
BY
ATTORNEY

June 24, 1958 W. A. DERR 2,840,797
SUPERVISORY CONTROL SYSTEMS AND APPARATUS
Filed Aug. 14, 1952 16 Sheets-Sheet 9

INVENTOR
Willard A. Derr.
BY
Ralph H Swingle
ATTORNEY

June 24, 1958 W. A. DERR 2,840,797
SUPERVISORY CONTROL SYSTEMS AND APPARATUS
Filed Aug. 14, 1952 16 Sheets-Sheet 10

WITNESSES:
INVENTOR
Willard A. Derr.
BY
ATTORNEY

INVENTOR
Willard A. Derr.
ATTORNEY

June 24, 1958

W. A. DERR 2,840,797

SUPERVISORY CONTROL SYSTEMS AND APPARATUS

Filed Aug. 14, 1952

INVENTOR
Willard A. Derr.
BY
*Ralph H Swingle*
ATTORNEY

June 24, 1958  W. A. DERR  2,840,797
SUPERVISORY CONTROL SYSTEMS AND APPARATUS
Filed Aug. 14, 1952  16 Sheets-Sheet 14

INVENTOR
Willard A. Derr.
BY
Ralph H. Swingle
ATTORNEY

United States Patent Office 2,840,797
Patented June 24, 1958

2,840,797

SUPERVISORY CONTROL SYSTEMS AND APPARATUS

Willard A. Derr, Pittsburgh, Pa., assignor to Westinghouse Electric Corporation, East Pittsburgh, Pa., a corporation of Pennsylvania Application August 14, 1952, Serial No. 304,269

17 Claims. (Cl. 340—163)

My invention relates generally to supervisory control systems, and has reference in particular to apparatus and systems for controlling equipment at one or more remote stations over radio frequency signal channels.

Generally stated, it is an object of my invention to provide, in a novel manner, for effecting supervisory control of equipment at remotely located stations.

More specifically, it is an object of my invention to provide for using normally energized radio signal channels at different frequencies for transmitting tone signals between a dispatching office and one or more remote stations for effecting operation of apparatus by means of supervisory control equipment.

Another object of my invention is to provide for complete channel supervision in a beamed microwave channel supervisory control system by utilizing a normally continuous signal and using the dispatching office receiving equipment to indicate a fault condition if the signal is removed for greater than a predetermined time.

Still another object of my invention is to provide for using a loop type signal channel between a dispatching office and one or more remote stations and transmitting the same tone signal to the most remote station over one part of the loop and back to the dispatching office on another part thereof.

It is also an object of my invention to provide in a microwave channel supervisory control system having a plurality of remote stations for transmitting the same signal tone from a dispatching office to a receiver at an adjacent remote station, retransmitting the same signal to the next remote station, and then retransmitting it back from station to station on a different microwave frequency so as to receive the same tone signal at the dispatching office.

It is also an important object of my invention to provide in a supervisory control system for using a microwave signal channel for normally transmitting continuous tone signal, interrupting the tone signal to produce coded signals and deenergizing the signal generator in the event there is a loss of battery at the dispatching office even momentarily.

Yet another object of my invention is to provide in a basically duplex type system using different frequencies between stations in opposite directions, for obtaining simplex operation by transmitting the same tone signals from a dispatching office to a remote station and from the remote station to the dispatching office.

Other objects will, in part, be obvious and will, in part, be explained hereinafter.

In practicing my invention in accordance with one of its embodiments, microwave transmitters operating at different frequencies are located at the dispatching office and a remote station for operation in conjunction with associated microwave receivers. The transmitter at the dispatching office is modulated by a tone transmitter keyed by the sending relay of supervisory control equipment. The receiver at the remote station operates on the same frequency as the transmitter at the dispatching office, and operates a tone receiver which energizes the receiving relay of the remote station supervisory control equipment. The same tone signal is retransmitted by the transmitter at the remote station after passing through a gain control amplifier so as to be received by the microwave receiver at the dispatching office. Channel supervision is maintained by utilizing a time delay relay which is energized by the receiving relay at the dispatching office, and operates to indicate a fault condition when the receiving relay is deenergized for greater than a predetermined time which is longer than any supervisory or control signal. The deenergization of the receiving relay at the remote station for more than this predetermined time is used to interrupt the tone circuit between the microwave receiver and the transmitter to likewise effect an indication of a fault condition.

For a more complete understanding of the nature and the scope of my invention, reference may be made to the following detailed description, which may be taken in connection with the accompanying drawings, in which.

Figure 1:
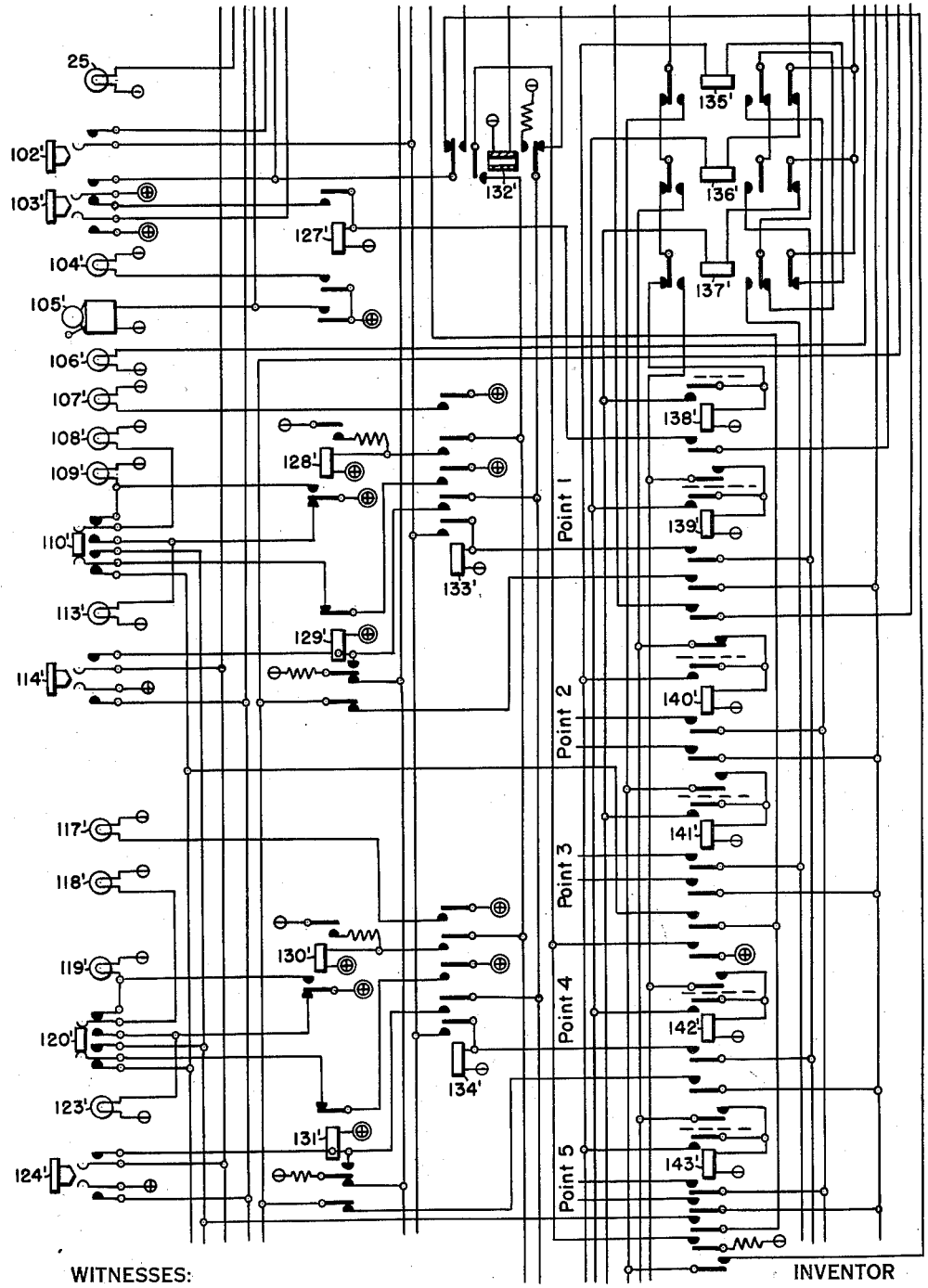
Figures 1 through 4 are a diagrammatic view of a supervisory control system embodying the invention in one of its forms.
Figure 2:
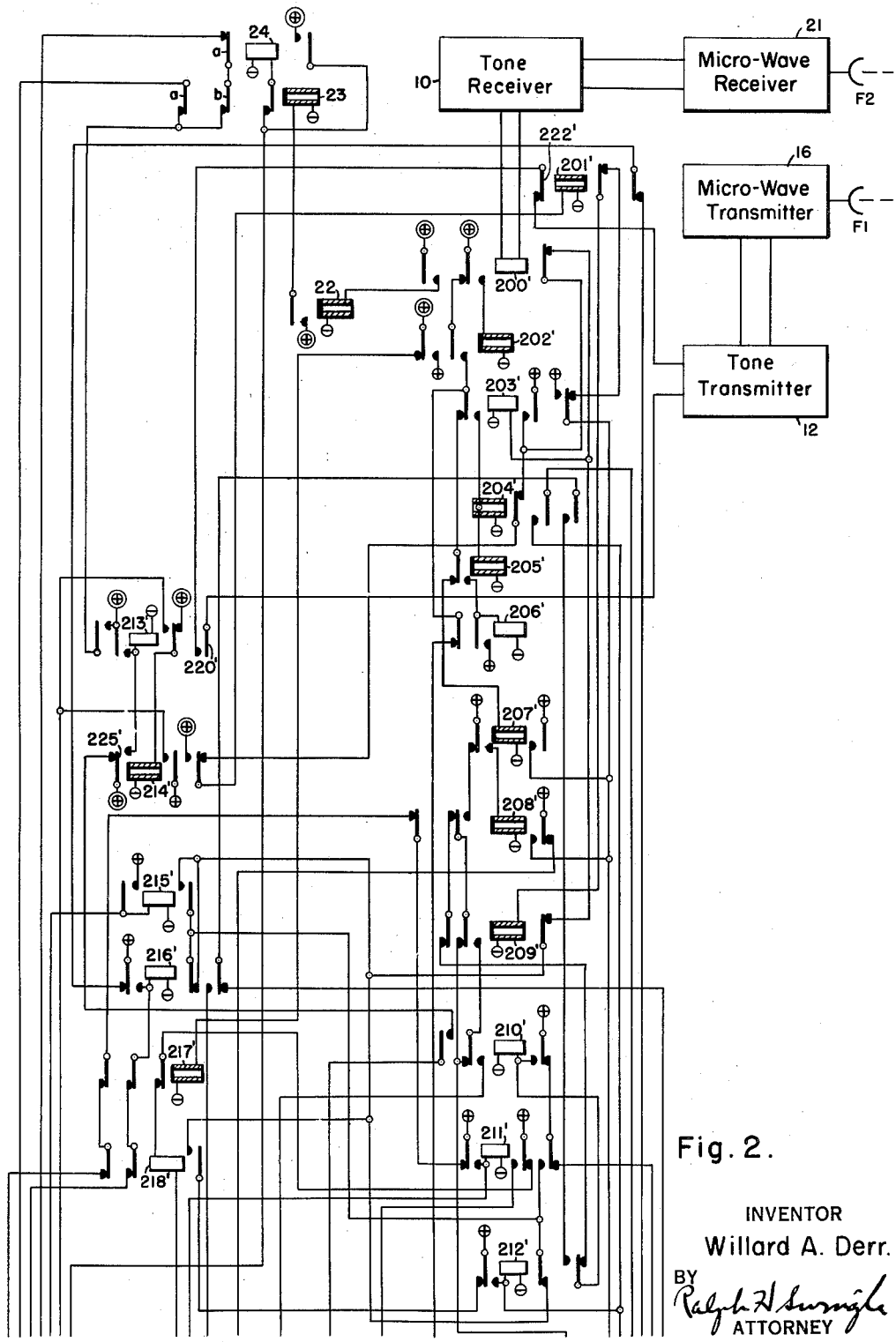
Figure 3:
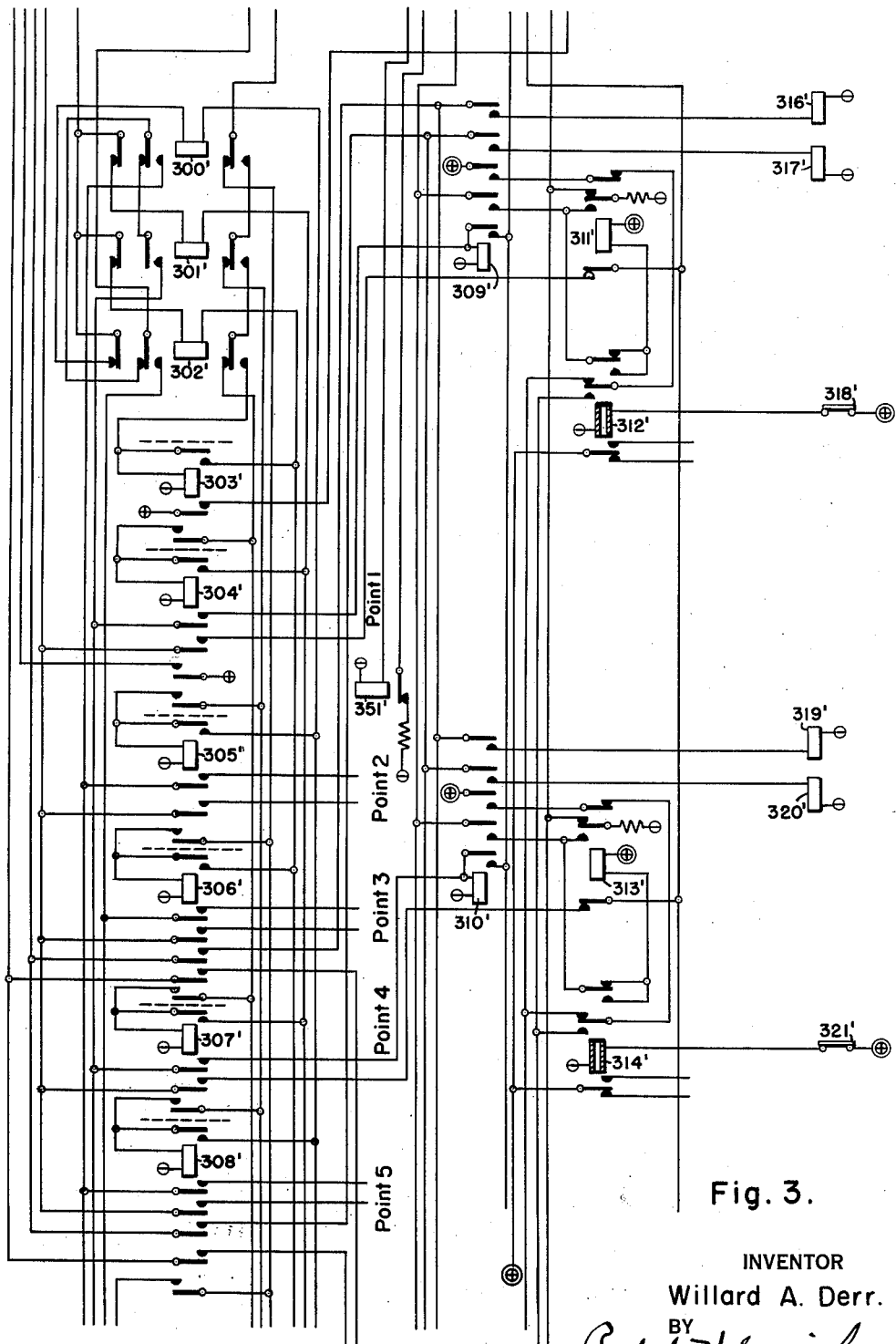
Figure 4:
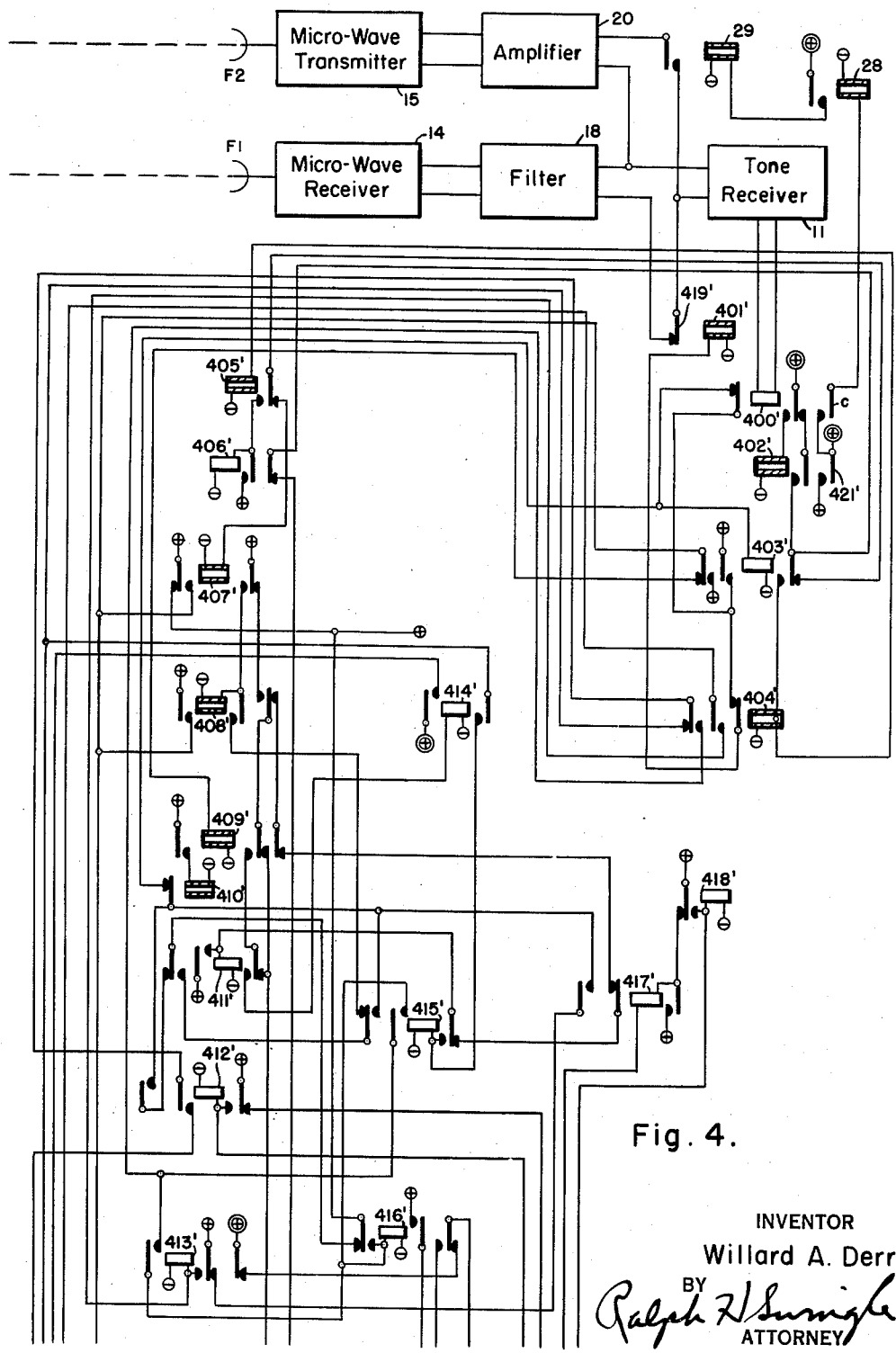
Figure 5:
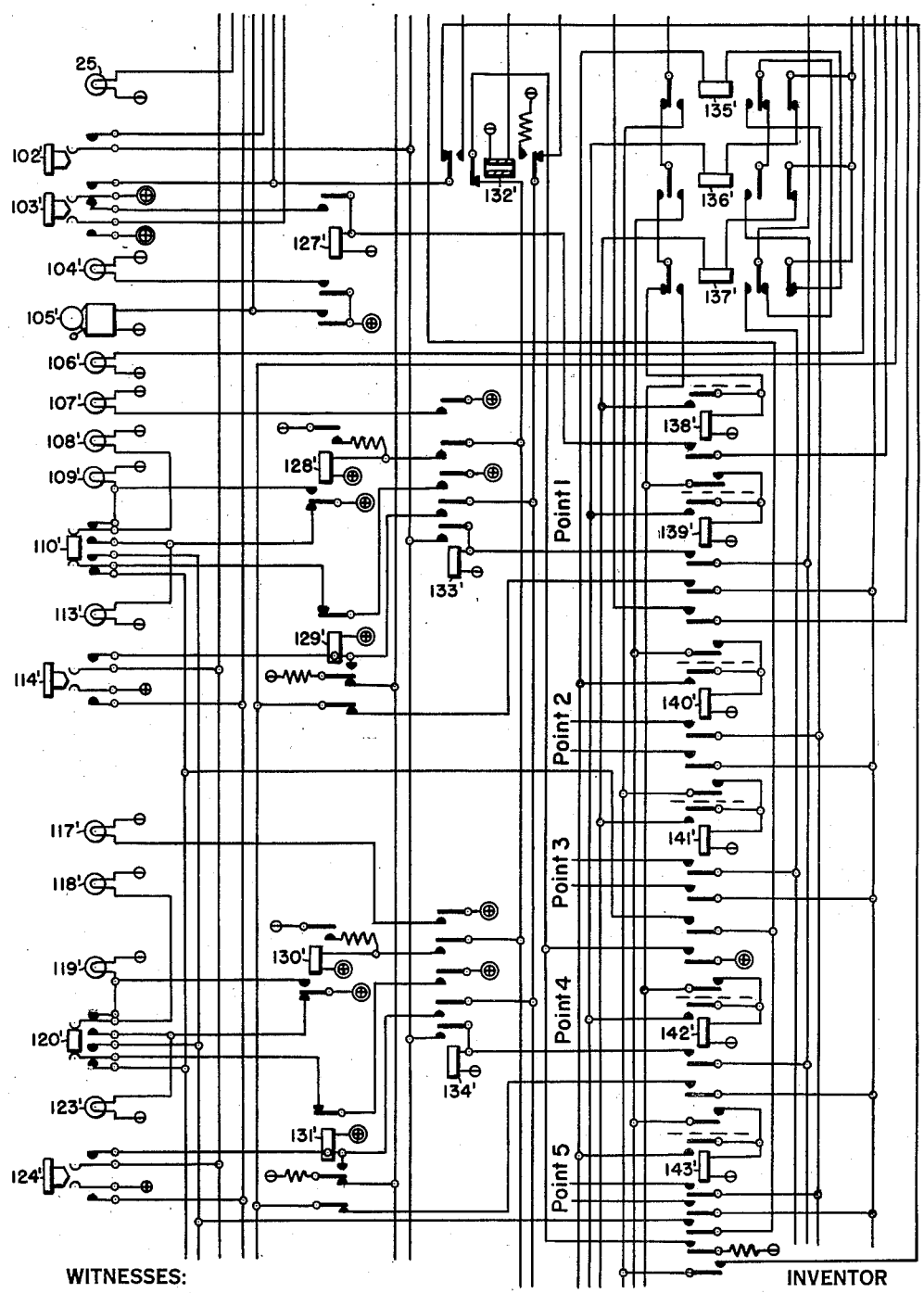
Figs. 5 through 8 are a diagrammatic view of a supervisory control system embodying the invention in another of its forms.
Figure 6:
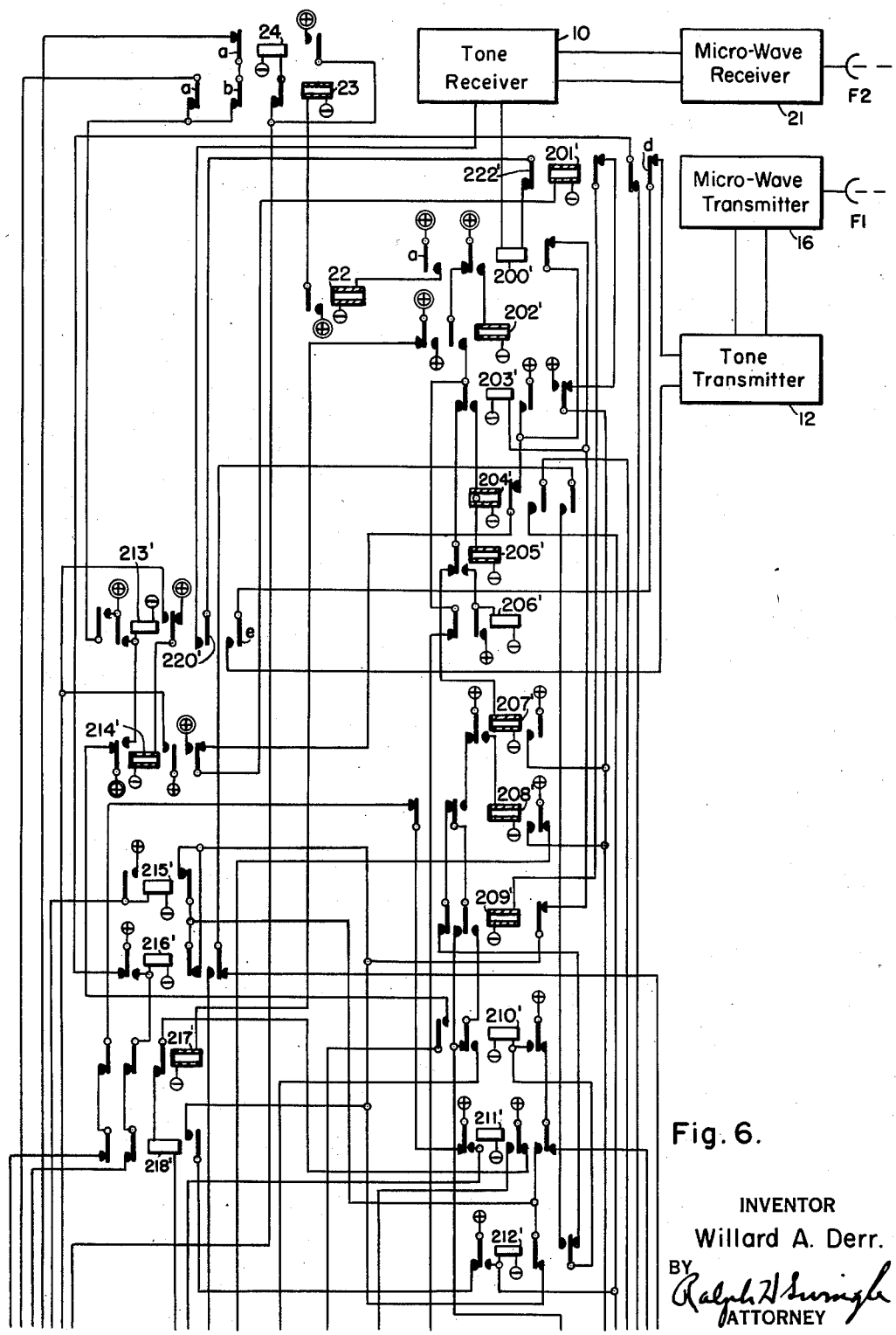
Figure 7:
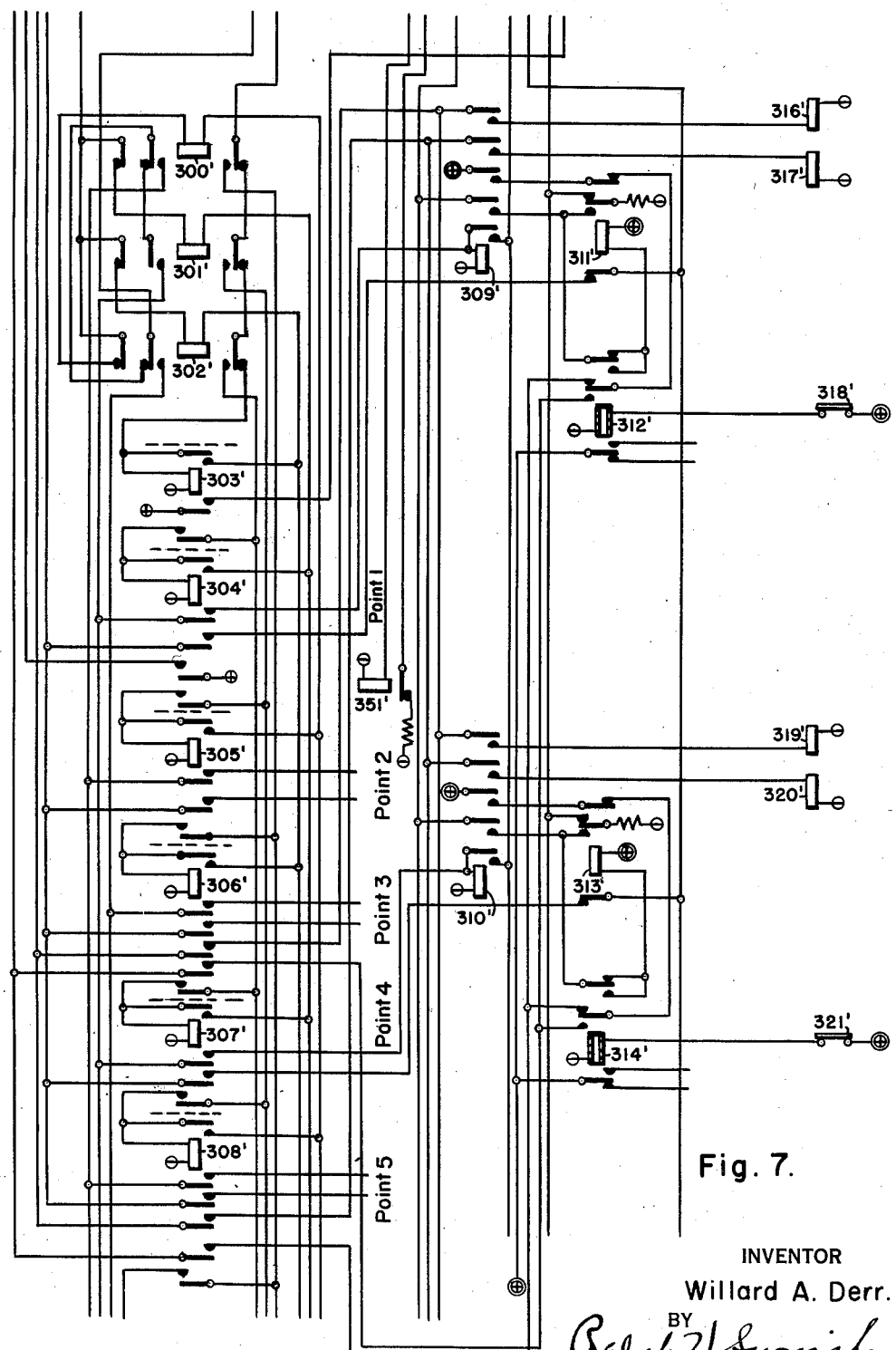
Figure 8:
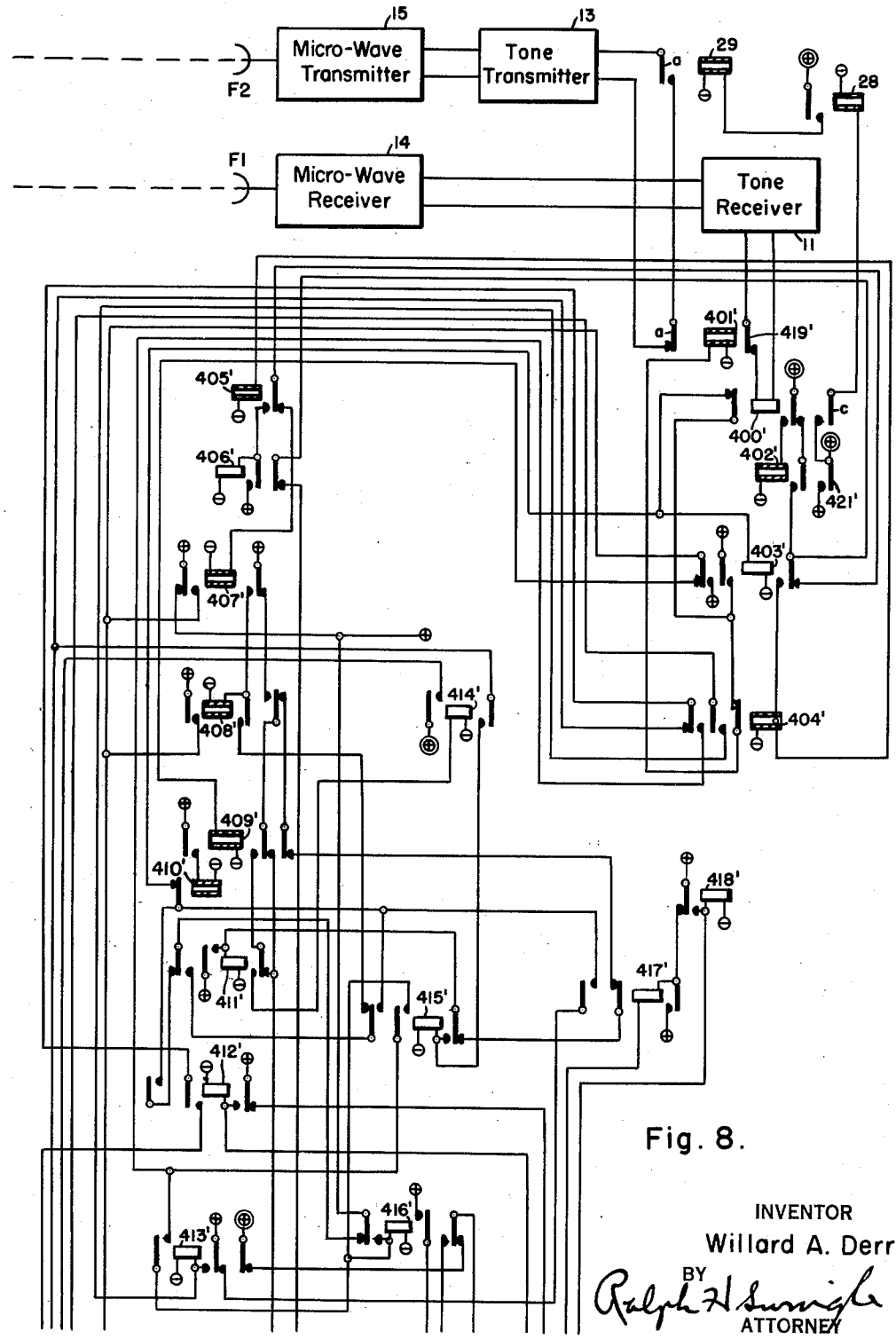
Figure 9:
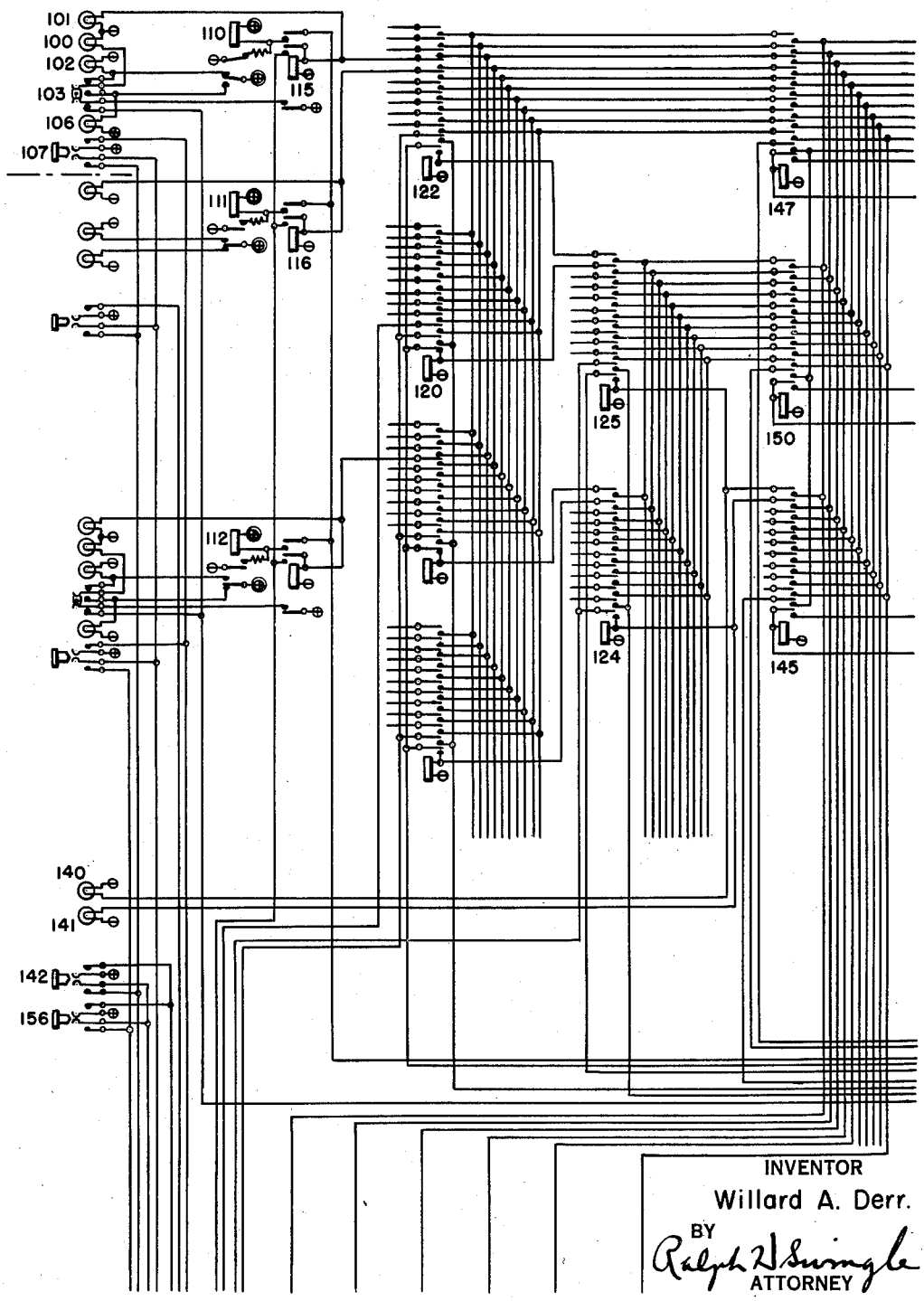
Figs. 9 through 15 are a detailed diagrammatic view of a multi-station supervisory control system embodying the invention in still another of its forms.
Figure 10:
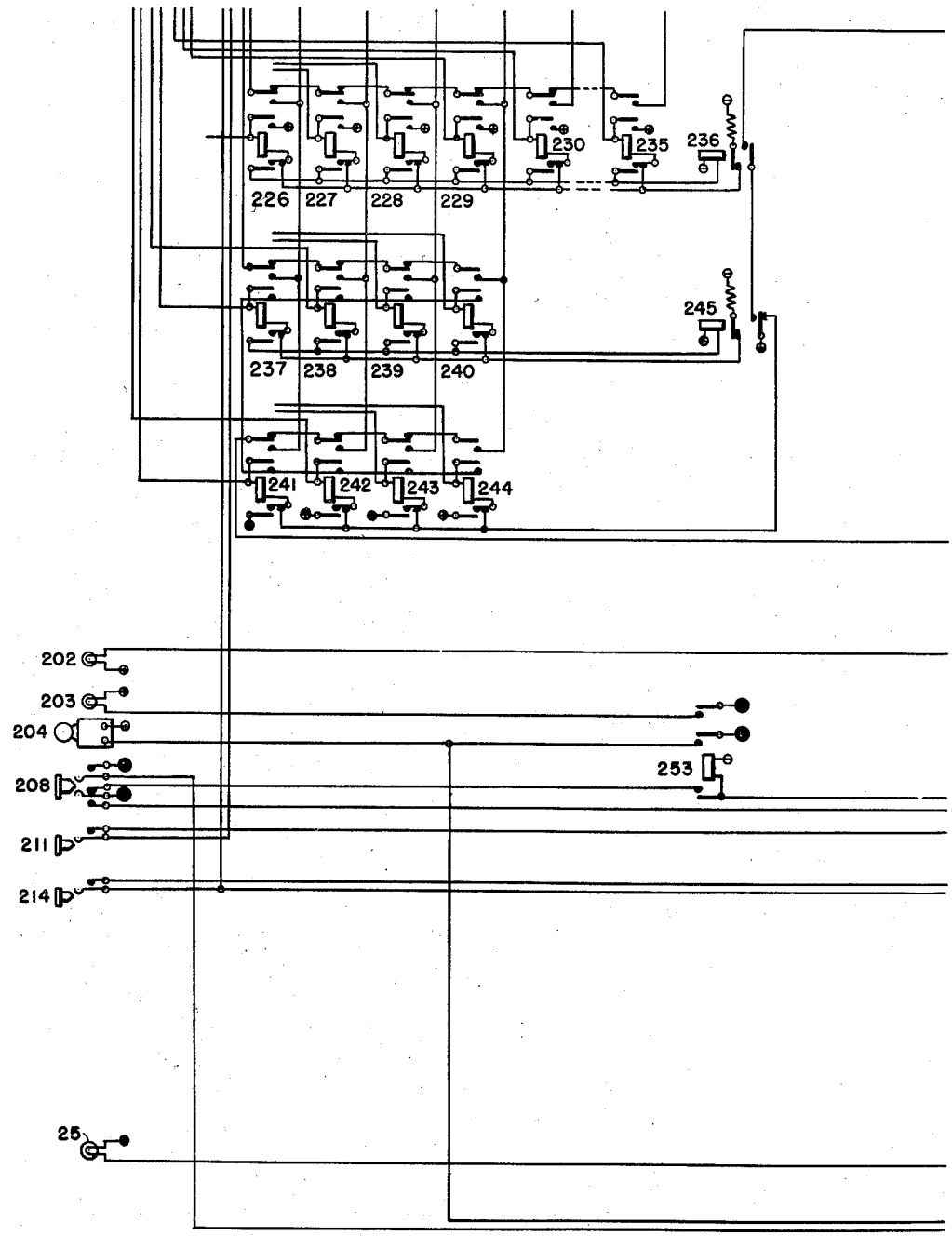
Figure 11:
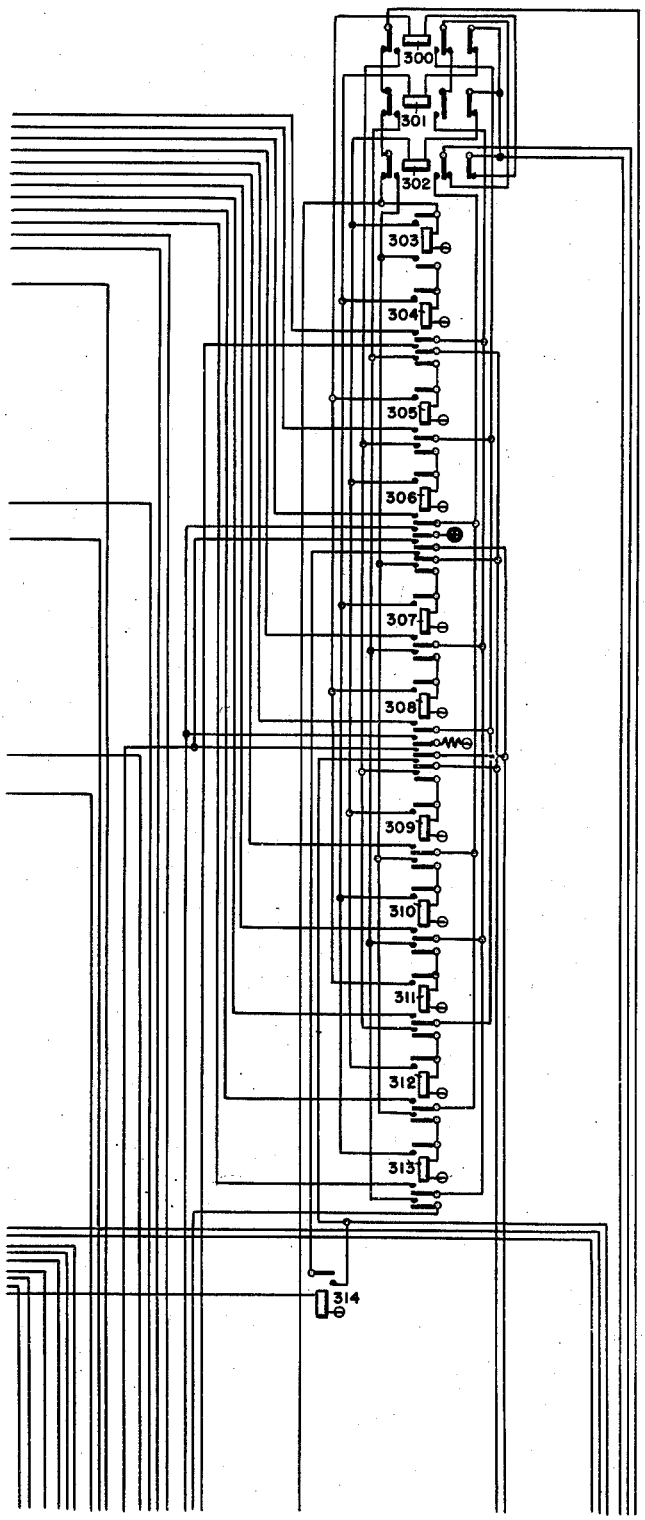

Referring to Figs. 1 through 4 of the drawings, it will be seen that the supervisory control equipment utilized therein is in part substantially identical with that shown and described in Patent No. 2,091,301, which issued on August 31, 1937, to Hans P. Boswau, entitled "Supervisory Control System." Substantially all the apparatus shown in Figs. 1 through 4, which is identical with that of the Boswau patent, has been identified by the same numerical designations, except that prime numbers have been used as a matter of expediency to distinguish from similar numbers used to describe the apparatus and drawings 9 through 16 of this application.

Instead of having the receiving relays 200 and 400 connected by a metallic circuit, as in the Boswau patent, these relays 200' and 400' are instead connected to be energized from tone receivers 10 and 11, respectively, which may be operated from radio receivers such as microwave receivers or the like. The sending relays 201 and 401 of Boswau are utilized as relays 201' and 401' to produce coded tone signals by, respectively, interrupting the keying circuit of a tone transmitter 12, and interrupting a tone circuit between a microwave receiver 14 and a microwave transmitter 15 at the remote station. Coded tone signals are transmitted between the dispatching office and the remote station by using the tone transmitter 12 to modulate the output of a microwave transmitter 16 operating on a frequency F1 at the dispatching office, and receiving the modulated signal by means of the microwave receiver 14 which operates on the same frequency. The tone signal is then passed through a filter 18 and is applied to the tone receiver 11 through an armature 419' of the sending relay 401' to the tone receiver 11 and to a gain control amplifier 20 which amplifies the tone signal and applies it to modulate the output of the microwave transmitter 15 which operates on a different frequency F2. The modulated signal is received at the dispatching office by a microwave receiver 21, also operating on the frequency F2, which receiver is connected to the tone receiver 10 for operating the supervisory receiving relay 200'. A simplex type channel in which the receiver at each station responds to signals originating from the station, is thus provided even though the channel is basically of a duplex type, since different carrier frequencies are used in opposite directions.

In order to provide for supervising the signal channel, time delay relays 22 and 23 may be provided in conjunction with a control relay 24 for effecting operation of the alarm bell 105' and an alarm lamp 25 in the event that the receiving relay 200' is deenergized for a predetermined time which is greater than that of any normal supervisory control signal. Relays 22 and 23 provide the necessary delay before energizing the alarm bell 105' and alarm lamp 25, while control relay 24 provides for stopping the bell when reset key 103' is operated. Additional supervision of the signal channel may be provided by using time delay relays 28 and 29 at the remote station for interrupting the tone circuit between the microwave receiver 14 and the microwave transmitter 15 in response to deenergization of a receiving relay 400' for greater than a predetermined time, whether by reason of failure of the tone receiver 11 or a loss of tone. This results in a loss of tone at the dispatching office, thus causing operation of the channel supervision equipment to energize the alarm.

In order to provide further supervision of the equipment and prevent false signals in the event of a loss of battery at the dispatching office, the energizing circuit for the tone transmitter 12 may be connected through armature 220' and the front contact of the battery relay 213'. This provides for deenergization of the tone transmitter in the event of a loss of battery at the dispatching office which will then result in a loss of tone at the remote station, thus preventing any false operation in the event that apparatus has been selected and is awaiting operation.

In normal operation, the microwave transmitters 15 and 16 will be energized and the tone transmitter 12 will be keyed to modulate the output of the transmitter 16, since the keying circuit will be completed through armature 220' and front contact of the battery relay 213' and armature 222' and back contact of the sending relay 201'. A continuous signal tone will, therefore, be transmitted from the dispatching office and received at the remote station over a frequency F1. This signal tone is then applied to the tone receiver 11 at the remote station through armature 419' and its back contact, effecting energization of the receiving relay 400'. The time delay relay 28 will, therefore, be energized through armature c of relay 400' and provide an obvious circuit for time delay relay 29 which connects the tone signal circuit to the gain control amplifier 20 so that the tone signal modulates the output of the microwave transmitter 15 operating on the frequency F2. This modulated signal is received at the dispatching office by the microwave receiver 21, which applies the tone signal to the tone receiver 10 causing energization of the receiving relay 200'. The time delay relays 22 and 23 will, therefore, be maintained in a normally energized condition.

If a supervisory control operation is initiated from the dispatching office by the operator momentarily pressing the point key 124', for example, the sending relay 201' will be successively energized under the control of counting relays 135' through 142' to interrupt the keying circuit for the tone transmitter 12 at armature 222' to produce a coded signal of four tone interruptions plus a fifth or dummy interruption. The modulated signal of the microwave transmitter 16 is correspondingly affected, and as a result the tone output of the microwave receiver 14 at the remote station is likewise interrupted. This causes a corresponding series of deenergizations of the receiving relay 400' at the remote station, resulting in energization of the point relay 310' in the manner which is described in detail in the Boswau patent hereinbefore referred to.

Upon receipt of the selection code, relay 412' at the remote station will be energized to initiate the transmission of a corresponding check code to indicate the selection of the desired point of the supervisory control. The sending relay 401' will thus be periodically energized under the control of the counting relays 303' through 308' to cause a series of four interruptions of the tone signal plus a fifth or dummy interruption similar to that effected from the dispatching office. The tone circuit between the microwave receiver 14 and the microwave transmitter 15 will thus be interrupted at armature 419' to effect a corresponding interruption in the tone signal applied to the microwave transmitter 15. The tone receiver 11 responds to these interruptions of the tone signal, thus effecting operation of the receiving relay 400' in synchronism with sending relay 401'. The modulated signal from the transmitter 15 is received by the microwave receiver 21 which energizes the tone receiver 10 in accordance therewith and causes the corresponding operation of the receiving relay 200'. Other supervisory control functions such as transmission of an operation code and transmission of a supervisory signal in response thereto will be performed in substantially the same manner.

In the event of a loss of tone signal from the remote station, time delay relays 23 and 22 will be deenergized in succession because of deenergization of receiving relay 200'. Obvious circuits for the alarm bell 105' and lamp 25 are completed at armatures b and a of relay 23. The circuit for the bell may be interrupted at armature a of relay 24 by operating the release key 103'.

If the loss of tone occurs between the dispatching office and the remote station, the same result is effected, since tone is thereby removed from the dispatching office also. If the tone receiver at the remote station fails, receiving relay 400' is deenergized. Time delay relays 28 and 29 deenergize in succession and interrupt the tone circuit between the microwave receiver 14 and the microwave receiver 15. This likewise removes the tone from the dispatching office and results in operation of relays 22 and 23 to operate the alarm bell and lamp.

Referring to Figs. 5 through 8, it will be seen that the supervisory control equipment is in part identical with that of Figs. 1 through 4, and also with that of the Boswau Patent 2,091,301. Instead of using a single tone transmitter as in the systems of Figs. 1 through 4, and retransmitting the same tone signal frim the remote station to the dispatching office, a tone transmitter 12 is used at the dispatching office to modulate the output of a microwave transmitter 16 operating on a frequency F1, and an additional tone transmitter 13 is used at the remote station to modulate the output of the microwave transmitter 15 which operates on a frequency F2. The tone transmitter 12 is controlled by the sending relay 201' at armature d and the battery relay 213' at armature e in the same manner as for the tone transmitter described in Figs. 1 through 4. The tone transmitter 13 is keyed by the sending relay 401' at armature a and has connected in circuit therewith an armature a of the time delay relay 29, which is controlled by the time delay relay 28 under the control of the receiving relay 400' in the same manner as described in connection with Figs. 1 through 4. The tone receiver 11 at the remote station is connected to be energized directly from the microwave receiver 14 so as to provide for operating the receiving relay 400'. Instead of interrupting the tone circuit by means of the sending relay 401', as was the case in the circuit shown in Figs. 1 through 4, armature 419' of the receiving relay 401' may be used to interrupt the connection of the receiving relay 400' to the tone receiver, so as to effect synchronized operation of the receiving relay 400' with that of a sending relay 401'. The sending relay 401' may be used to key the tone transmitter 13 at armature a for effecting interruption of the tone signal to produce coded signals.

At the dispatching office the microwave receiver 21 may be connected to energize the tone receiver 10. The receiving relay 200' may be connected to the tone receiver 10 through an armature 222' of the sending relay 201' so as to provide for operating the receiving relay in synchronism with the sending relay.

Under normal conditions the tone transmitter 12 will be keyed so as to modulate the output of the microwave transmitter 16. This signal is received by the microwave receiver 14 resulting in energization of the receiving relay 400' from the tone receiver 11. The tone transmitter 13 is likewise keyed to modulate the output of the microwave transmitter 15, and this signal is received by the microwave receiver 21 at the dispatching office effecting energization of the receiving relay 200' through the tone receiver 10. If the supervisory or control signal is transmitted from the dispatching office, the sending relay 201' will interrupt the keying circuit of the tone transmitter 12 at armature $d$ causing an interruption in the tone signal. At the same time the energizing circuit for the receiving relay 200' is interrupted at armature 222', thus causing the receiving relay to step in synchronism with the sending relay.

At the remote station, the receiving relay 400' is energized from the tone receiver 11 and causes operation of the supervisory control equipment in the usual manner resulting, for example, in operation of the point relay 310'. At the termination of the point selection code, a check code is initiated by relay 412' which effects operation of a sending relay 401' to interrupt the keying circuit of tone transmitter 13 at armature $a$, causing the transmission of a coded signal corresponding to the code of the point selected. At the same time, the energizing circuit for the receiving relay 400' is interrupted at armature 419', causing the receiving relay to operate in synchronism with the sending relay. At the dispatching office, the modulated signal is received by the microwave receiver 21, resulting in periodic energization of the receiving relay 200' which causes the supervisory control equipment to operate in the usual manner. Other supervisory and control functions are performed in like manner, the supervisory control equipment operating exactly as described in detail in the Boswau patent.

In the event in the loss of signal at the remote station, the receiving relay 400' will be deenergized. If this deenergization is for longer than a normal signal interval, time delay relay 28 will be deenergized, thus interrupting the energizing circuit for the relay 29 and causing interruption of the keying circuit for the tone transmitter 13. This results in deenergization of the receiving relay 200' at the dispatching office, thus releasing time delay relay 22, which in turn deenergizes time delay relay 23, and sets up obvious energizing circuits for the alarm lamp 25 and the alarm bell 105' through armatures $a$ and $b$ thereof. Control relay 24 may be energized in response to operation of the reset key 103' to interrupt the circuit for the alarm 105' at armature $a$ of relay 24.

A loss of battery at the dispatching office causes release of the supervisory equipment when battery is restored, by relay 213' providing an energizing circuit for release relay 214'. The tone transmitter is deenergized at armature $d$ of relay 213', causing a loss of tone at the remote station and thus releasing the supevisory equipment in a manner similar to that described in the Boswau patent.

Referring to Figs. 9 through 16, it will be seen that invention is herein described in connection with a multi-station supervisory control system which is in part substantially identical with that described in detail in Reissue Patent No. 21,284 which issued on December 5, 1939, to Hans P. Boswau. Figs. 9 through 15 of the drawings correspond to Figs. 1 through 7 of the Boswau patent and the supervisory control equipment of Figs. 9 through 15 is designated by the same numerals as in the Boswau patent.

Instead of having the receiving relays 431 and 511 connected in a parallel line circuit, as in the Boswau patent, they are connected to be energized from tone receivers operating in response to a tone signal transmitted by means of microwave transmitters.

Figure 12:
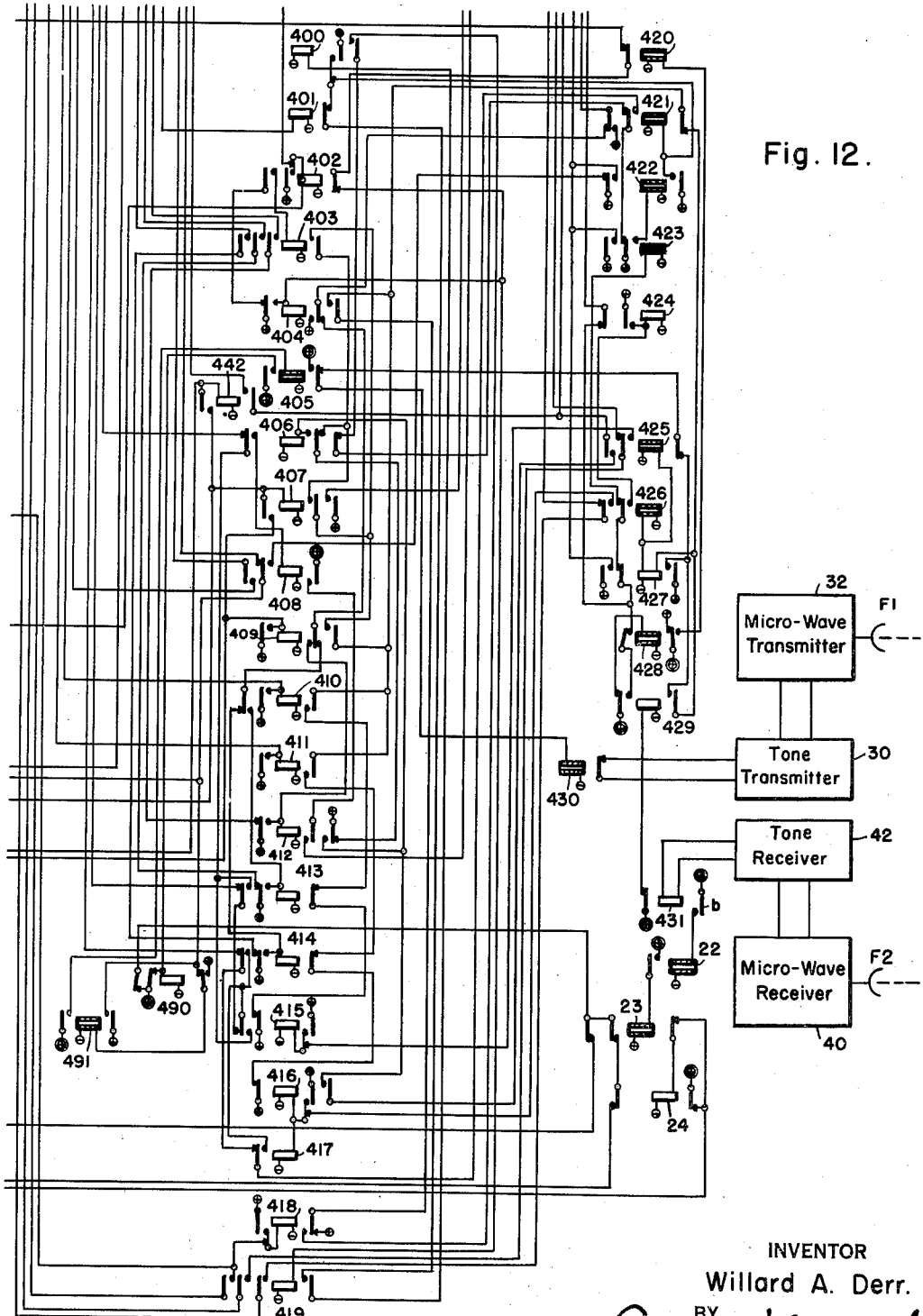
Figure 13:
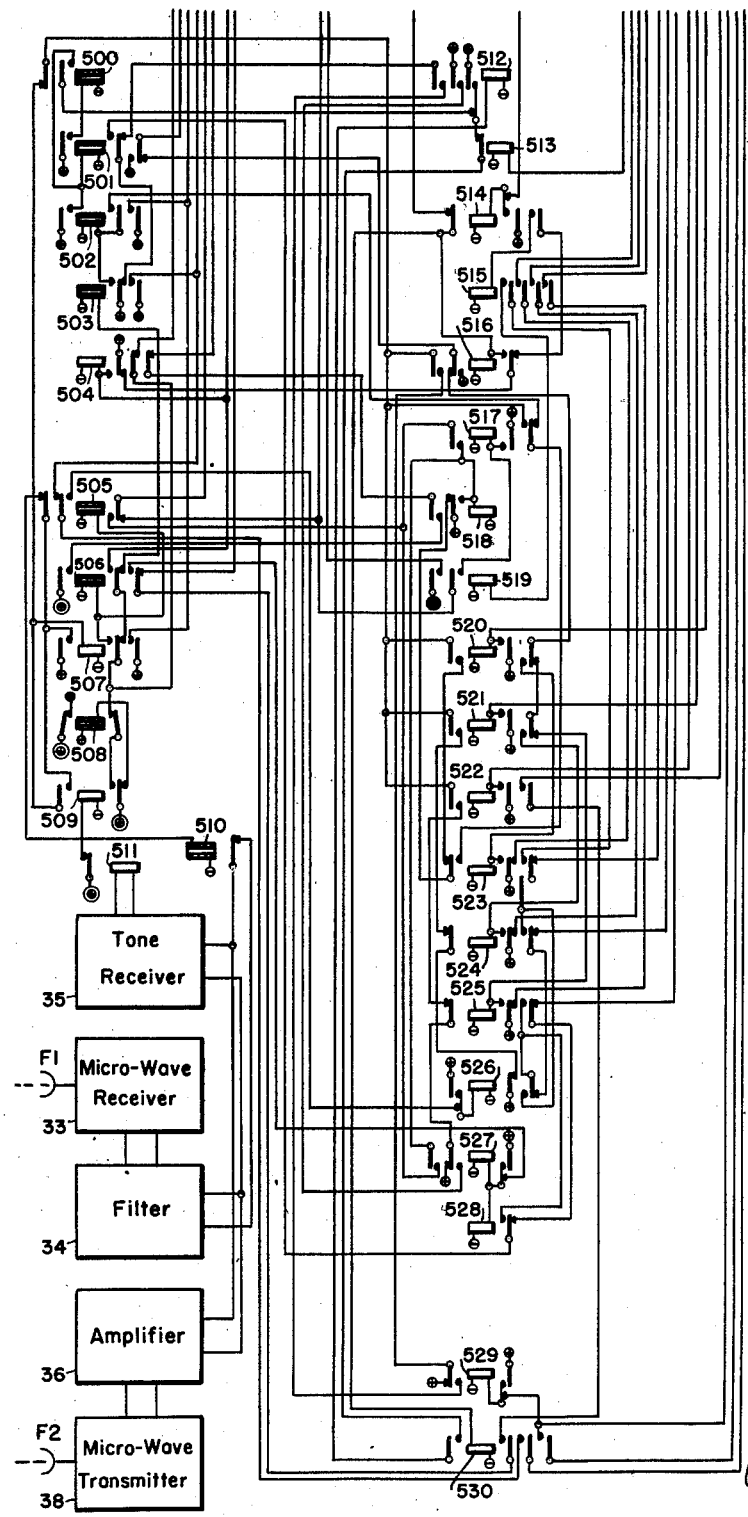
Figure 14:
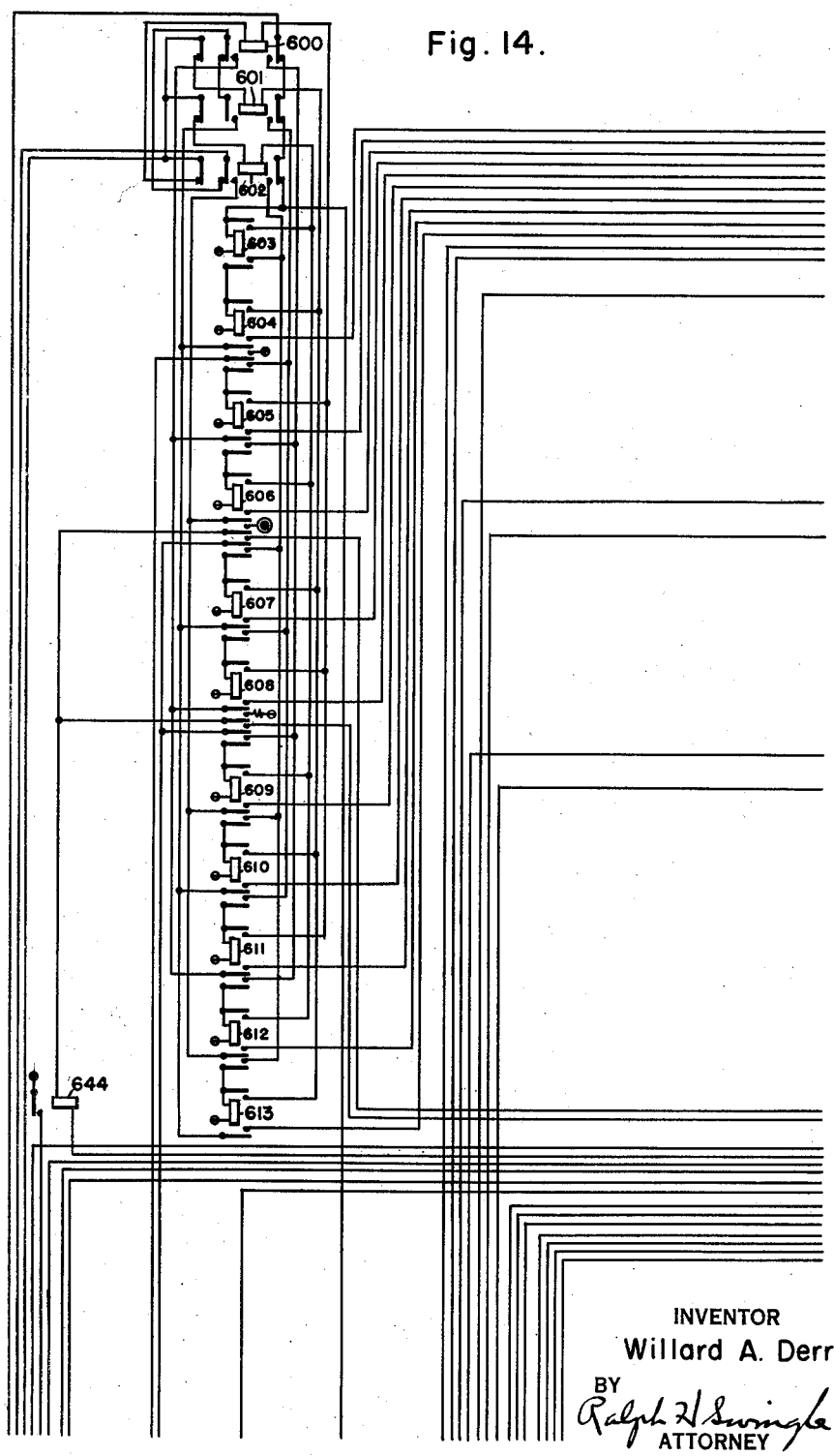
Figure 15:
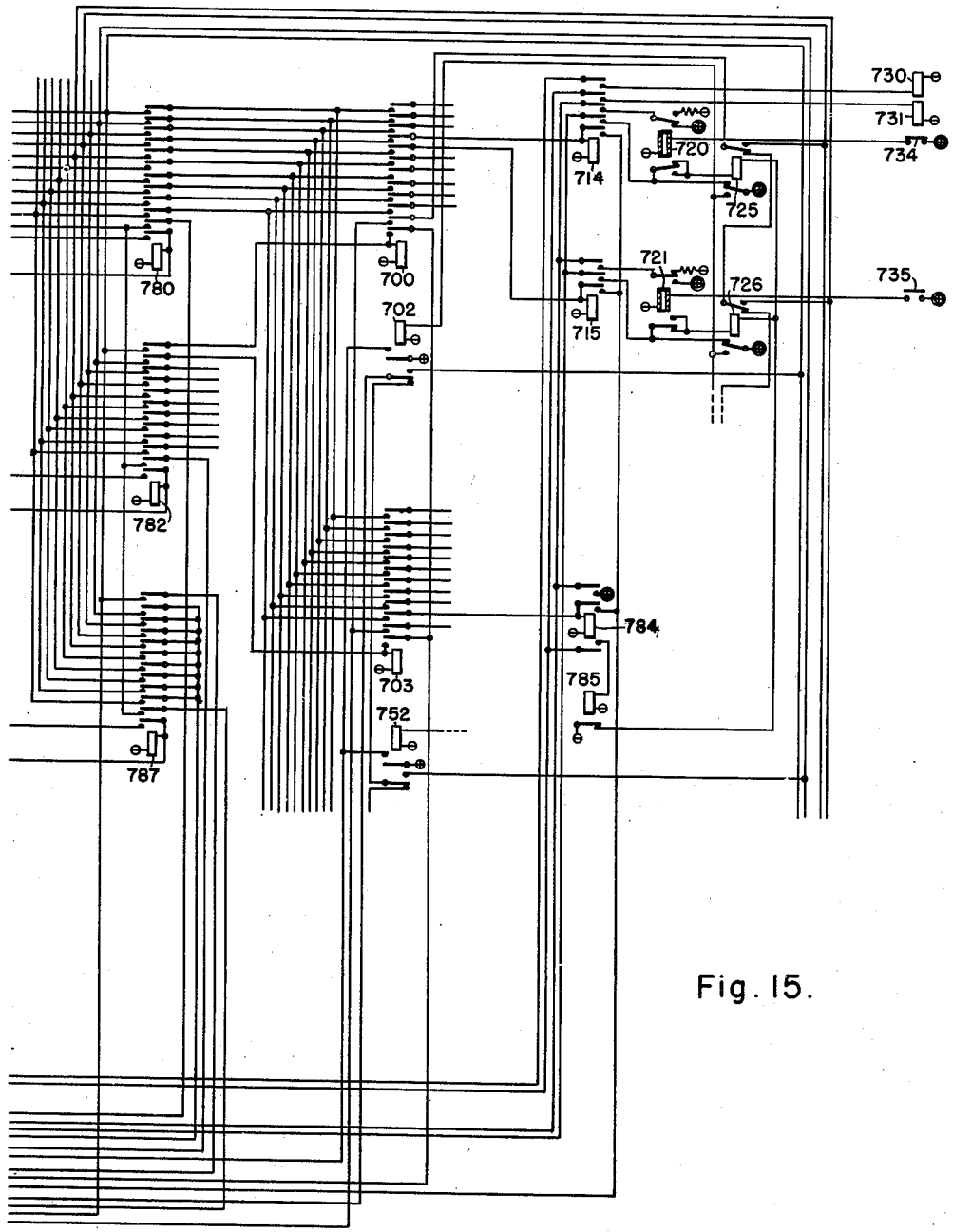

Referring particularly to Figs. 12 and 13 of the drawings, it will be seen that the sending relay 430 at the dispatching office is used to interrupt the keying circuit for a tone transmitter 30 which is connected to modulate the output of a microwave transmitter 32 operating on a frequency F1. This modulated signal is received by a microwave receiver 33 at the most remote station and passes through a filter 34 to a tone receiver 35 which operates the receiving relay 511, and also to a gain control amplifier 36, through contacts of the sending relay 510, whence it is applied to a microwave transmitter 38 operating on a frequency F2. This modulated signal is received at the dispatching office by a microwave receiver 40 which applies the demodulated signal to a tone receiver 42, which is connected to energize the receiving relay 431. Supervision of the signal channel is effected by utilizing time delay relays 22 and 23 in conjunction with a reset relay 24 for operating an alarm in response to deenergization of the receiving relay 431 for longer than a normal signaling interval, in a manner similar to that described in connection with the system of Figs. 1 through 4.

In normal operation the tone transmitter 30 at the dispatching office will be energized so as to modulate the output of the microwave transmitter 32 continuously. This modulated signal is received at the remote station, effecting energization of the receiving relay 511. At the same time, the tone signal is applied through the amplifier 36 to the microwave transmitter 38, where it is retransmitted on a frequency F2 to the dispatching office so as to effect energization of receiving relay 431 connected to the microwave receiver 41 to the tone receiver 42. Supervisory control signals are transmitted from either the dispatching office or any one of the remote stations by operation of the supervisory control equipment in the usual manner through operation of the supervisory control relays in response to operation of an operation key such as key 107 at the dispatching office, or in response to operation of a circuit breaker auxiliary switch such as the switch 735 at the remote station. This results in interruption of the normal tone signal in response to operation of the supervisory sending relay. Since the same tone signal is transmitted from the dispatching office to the remote stations and then back to the dispatching office, operation of the supervisory receiving relays is effected in synchronism with that of any one of the sending relays. Selection of the proper station, group and point are effected in the usual manner as described in detail in the Boswau reissue patent, and supervision of the signal channel is also obtained, since a loss of tone at any point in the loop results in deenergization of the receiving relay at the dispatching office, and hence results in deenergization of the line supervision relays 22 and 23, causing energization of alarm bell 204 and lamp 25.

Figure 16:
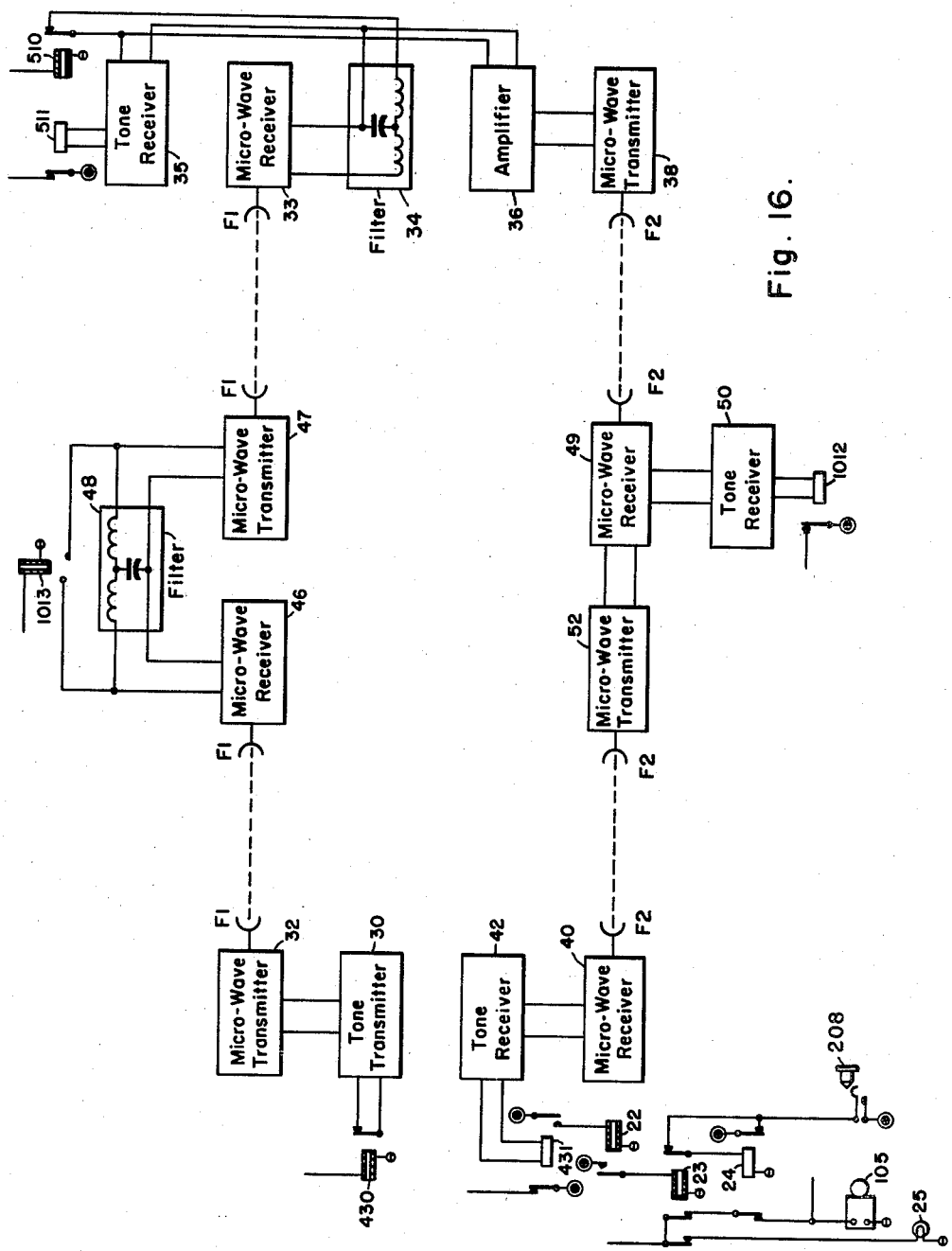
Fig. 16 is a schematic diagram of a multi-station system such as shown in Figs. 9 through 15, showing an additional station connected in the system.

Since Figs. 9 through 15 of the Boswau patent show only the equipment at the dispatching office and one remote station, Fig. 16 has been added to give a diagrammatic view of a multi-station system embodying at least one station intermediate the dispatching office and the most remote of the stations. Fig. 16 corresponds in part to Fig. 10 of the Boswau patent which illustrates a series line circuit for a plurality of remote stations. Referring to Fig. 16 will be seen that the sending relay 430 at the dispatching office is connected in the keying circuit of a tone transmitter 30 so as to provide for interrupting the modulated signal of the microwave transmitter 32 which operates on a frequency F1. This modulated signal is received by a microwave receiver 46 at an intermediate remote station, which receiver is connected to a microwave transmitter 47 operating on the same frequency, through an armature and back contact of the sending relay 1013 of the intermediate station. This provides for interrupting the tone signal in response to operation of the supervisory control equipment at this intermediate station. A filter 48 may be provided in parallel with the armature and contact of relay 1013 for by-passing frequencies other than that used for tone signaling in the event that other functions, such as telemetering or the like, may be carried on over the same signal channel.

The modulated tone signal may be retransmitted on the same frequency F1 by the transmitter 47 and received at the most remote station by a microwave receiver 33, which may be connected both to a tone receiver 35 for operating a receiving relay 511 and to a gain amplifier 36, through a normally closed circuit controlled by the sending relay 510 at the remote station for modulating the output of a microwave transmitter 38 operating on a different microwave frequency F2. This signal is received at the intermediate station by a microwave receiver 49 connected to a tone receiver 50 for operating the receiving relay 1012 at the intermediate station. It is also connected to a microwave transmitter 52 also operating on the frequency F2 for transmitting the modulated signal to a microwave receiver 40 at the dispatching office. A tone receiver 42 is energized from the microwave receiver 40 to effect energization of the receiving relay 431 in response to receipt of a signal tone. Time delay relays 22 and 23, in conjunction with a reset relay 24, function to operate a channel supervision alarm and lamp as described hereinbefore.

From the above description and the accompanying drawings it will be apparent that I have provided, in a simple and effective manner, for operating a supervisory control equipment over radio or microwave channels. Continuous supervision of the signal channel is maintained by utilizing a normally energized system in which the absence of a normally continuous signal tone for a greater time than used in signaling effects operation of an alarm to warn the operator of a fault position. Keying of the receiving relays may be effected directly from the sending relays where different tone transmitters are used at the dispatching office and remote station. Synchronizing of the receiving and sending relays is effected automatically when the same tone signal is retransmitted from a dispatching office to one or more remote stations and back to the dispatching office.

Since certain changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a supervisory control system having supervisory control equipment including sending and receiving supervisory relays, normally energized radio transmitting and receiving means, a tone transmitter, circuit means normally connecting the tone transmitted to modulate the radio transmitter signal, said circuit means including contacts responsive to operation of the supervisory sending relay connected in circuit with the tone transmitter to interrupt operation thereof, a tone receiver connected to be energized through the radio receiving means, circuit means connecting the supervisory receiving relay to be energized in response to receipt of a tone signal from the tone receiver, and supervision means operable in response to the maintenance of a predetermined operating condition of the receiving relay for an interval longer than any signal interval.

2. Apparatus at a dispatching office in a supervisory control system comprising, a microwave transmitter normally operating on one frequency, a tone transmitter normally operable to modulate said one frequency, a supervisory control sending relay operable in response to supervisory equipment at the dispatching office to interrupt operation of the tone transmitter to provide coded impulse signals, a supervisory receiving relay for operating supervisory equipment in response to coded signals, a tone receiver connected to operate the supervisory receiving relay, a microwave receiver normally connected to effect operation of the tone receiver in response to a normally transmitted tone modulated microwave signal from a remote station, a normally energized time delay relay operable in response to non-operation of the receiving relay for greater than a normal signal time, and channel supervision means controlled by operation of the time delay relay.

3. In a supervisory control system, supervisory control apparatus at one station including normally deenergized supervisory sending and normally energized supervisory receiving relays, a radio frequency transmitter normally operating on one frequency, a tone transmitter normally connected to modulate the radio frequency transmitter frequency, circuit means connecting the supervisory sending relay to interrupt energization of the tone transmitter and produce coded tone signals, a radio frequency receiver normally responsive to a different frequency transmitted from another station, a tone receiver operated from the radio frequency receiver on a tone signal from said another station of the same frequency as the tone transmitter, and circuit means connecting the supervisory receiving relay to the tone receiver including normally closed contacts of the supervisory sending relay.

4. In a supervisory control system, supervisory control equipment at each of a dispatching office and a remote station including supervisory receiving relays for effecting operation of the supervisory equipment in response to coded signals and supervisory sending relays, microwave transmitters at the dispatching office and the remote station normally operating on different frequencies, microwave receivers at the remote station and the remote station normally energized for operating on the same frequencies as the transmitters at the dispatching office and remote station respectively, a tone transmitter, a circuit normally connecting the tone transmitter to modulate the microwave transmitter at the dispatching office and produce a tone signal interrupted in response to operation of the dispatching office supervisory sending relay, a tone receiver normally connected to operate the supervisory receiving relay at the remote station, a circuit connecting the microwave receiver to the tone receiver and the microwave transmitter at the remote station, a tone receiver at the dispatching office, and circuit means connecting said tone receiver to both the microwave receiver and to the supervisory receiving relay to operate the receiving relay on the same tone signals produced by the dispatching office supervisory sending relay.

5. In a supervisory control system, supervisory control equipment at each of a dispatching office and a remote station including supervisory sending and receiving relays, a normally operable tone transmitter at the dispatching office operable to produce a predetermined signal; means interrupting operation of the transmitter to produce coded signals in response to operation of the dispatching office sending relay, means including a tone receiver at the remote station for operating the receiving relay and simultaneously reproducing said signal in response to a signal from the dispatching office, and an additional tone receiver at the dispatching office for simultaneously operating the receiving relay at the dispatching office in response to the said signal from the remote station.

6. In a supervisory control system, supervisory control equipment at each of a dispatching office and a remote station including sending and receiving relays operable to produce and responsive to coded signals respectively, a tone transmitter, a circuit normally connecting the tone transmitter to produce a tone signal interrupted by the sending relay at the dispatching office, a tone receiver at the remote station normally responsive to said tone signals and connected to operate the receiving relay at the remote station in response to tone signals, a circuit for interrupting the tone signal in response to operation of the sending relay at the remote station, and a tone receiver at the dispatching office connected to normally operate the receiving relay at the dispatching office in response to all tone signals.

7. In a supervisory control system, dispatching office and remote station supervisory control equipments including sending and receiving relays at each the dispatching office and remote station, a normally energized tone transmitter at the dispatching office producing a tone signal, a circuit for keying said tone transmitter by interrupting energization thereof to produce coded tone signals in response to operation of the dispatching office supervisory sending relay, a tone receiver at the remote station normally responsive to said tone signal, a circuit connecting the supervisory receiving relay at the remote station to be normally energized from the tone receiver, a tone transmitter at the remote station circuit means normally connecting the transmitter at the remote station to a source of electrical energy including a normally closed contact of the remote station sending relay for producing interrupted tone signals in response to operation of the supervisory equipment at the remote station, and a tone receiver at the dispatching office normally connected to effect simultaneously operation of the dispatching office receiving relay with the remote station receiving relay in response to receipt of the tone signal from the remote station.

8. In a supervisory control system, supervisory control equipment at each of a dispatching office and a remote station including supervisory control sending and receiving relays for producing and responding to coded signals, signal means at the dispatching office including a tone transmitter, a circuit connecting the tone transmitter to be normally energized including a normally closed contact of the supervisory control sending relay at the dispatching office, a tone receiver at the remote station responsive to the tone from the dispatching office transmitter, a circuit connecting said tone receiver to normally operate the remote station receiving relay, said circuit at the remote station including a normally closed contact of the remote station sending relay for causing the receiving relay to respond to operation of the remote station sending relay when producing coded tone signals, time delay means operable in response to deenergization of the receiving relay at the remote station for longer than any coded signal time to interrupt said circuit means, a tone receiver at the dispatching office normally operable to energize the dispatching office receiving relay responsive to said interruption of said circuit means, and time delay means operable in response to deenergization of the dispatching office receiving relay for more than a predetermined time which is greater than the duration of any code signal.

9. In a supervisory control system, a normally energized radio frequency receiver at one location responsive to one frequency received from another location, a tone receiver at said one location normally energized from the radio frequency receiver in response to a tone modulation of said one frequency, a supervisory receiving relay at said one location connected to be energized in response to receipt of a tone signal from said radio frequency receiver by said tone receiver, a radio frequency transmitter at said one location normally operating on a different frequency, a normally energized tone transmitter connected to modulate the radio frequency transmitter, a supervisory sending relay having a contact connected to normally effect deenergization of the tone transmitter, and supervisory control equipment at said one location connected to be operated by said supervisory receiving relay and to operate said supervisory sending relay.

10. Supervisory control apparatus comprising, a microwave transmitter at one location normally operating on one frequency, a tone transmitter connected to modulate the microwave transmitter, supervisory control equipment having a receiving relay and a supervisory sending relay connected to energize the tone transmitter normally and deenergize it in response to operation of the supervisory control equipment to produce coded signals, a microwave receiver normally energized to respond to a different frequency transmitted from another location, a tone receiver of the same frequency as the tone transmitter normally connected to be energized from the microwave receiver, and circuit means normally connecting the supervisory receiving relay to be energized from the tone receiver including a contact of the supervisory sending relay.

11. In supervisory control apparatus, a radio receiver at one location normally operating to produce tone signals from a tone modulated signal of one radio frequency transmitted from another location, a tone receiver connected to respond to tone signals from said radio receiver, a supervisory receiving relay connected to be normally energized in response to said tone signal from the tone receiver, a radio transmitter normally operating on a different frequency, a supervisory sending relay operable to produce coded tone signals, and a circuit controlled by the supervisory sending relay normally connecting the radio receiver to both the tone receiver and to the radio transmitter to normally apply tone signals thereto from the radio receiver.

12. Supervisory control apparatus comprising, a microwave receiver operating to receive a tone modulated signal of one frequency from a remote location, a tone receiver responsive to said modulating tone, a supervisory receiving relay connected to be normally energized from the tone receiver, a microwave transmitter normally operating on another frequency, circuit means connecting the microwave receiver to the tone receiver and to the microwave transmitter, a supervisory sending relay operable to produce coded tone signals, said sending relay having a normally closed contact in said circuit means, and an amplifier connected in said circuit means between the microwave receiver and transmitter to amplify the same tone signal for retransmission.

13. In a multi-station supervisory control system, supervisory control equipment at each of a dispatching office and a plurality of remote stations including supervisory sending and receiving relays, normally energized transmitting means at the dispatching office, a tone transmitter at the dispatching office for normally modulating the transmitting means, a keying circuit for the tone transmitter controlled by the dispatching office sending relay to interrupt energization of the tone transmitter and produce coded signals, receiving and transmitting means at each of the remote stations, a circuit connecting the receiving and transmitting means at each remote station including a normally closed contact of the supervisory sending relay, a tone receiver at the most remote station connected to said circuit for normally operating the supervisory receiving relay at that station, and additional receiving and transmitting means at each of the remote stations intermediate the most remote and the dispatching office normally energized for receiving and retransmitting tone signals back to the dispatching office, a tone receiver energized from each of said receiving means to normally effect operation of the supervisory receiving relay at the particular intermediate remote station, receiving means at the dispatching office, and a tone receiver energized from the receiving means connected to operate the dispatching office receiving relay.

14. In a multi-station supervisory control system, supervisory control equipment at each of a dispatching office and a plurality of remote station locations including supervisory sending and receiving relays respectively operable to produce and operable in response to coded signals, a radio transmitter at the dispatching office normally operating on one frequency, a tone transmitter connected to normally modulate said radio transmitter in response to operation of the dispatching office sending relay, a radio receiver and a radio transmitter at each of the remote stations but the most remote one and a radio receiver at the most remote one normally operating on said one frequency, a radio transmitter at the most remote station normally operating on a different frequency, a circuit connecting the transmitter and receiver at each of said remote stations to retransmit coded signals, said circuit including contacts of the supervisory sending relay of the particular remote station for interrupting said circuit to produce coded signals, a tone receiver connected to said circuit at the most remote station and to the supervisory receiving relay at said station, an amplifier connected in said circuit at the most remote station for amplifying the output of the radio receiver, a radio receiver and a radio transmitter at each of the remote stations intermediate the dispatching office and the most remote one normally operating on said different frequency, a tone receiver normally energized from each of said radio receivers operating on said different frequency for operating the supervisory receiving relay at the intermediate station, a radio receiver at the dispatching office normally operating on said different frequency, a tone receiver connected to the radio receiver to normally operate the supervisory receiving relay at the dispatching office, and a time delay relay operable when the receiving relay at the dispatching office is deenergized for greater than any coded signal interval for indicating a defect in the system.

15. In supervisory control apparatus, supervisory control equipment at one station including a receiving relay and a sending relay, a microwave receiver normally connected to respond to tone modulated signals on one frequency from another station, a microwave transmitter normally operating on a different frequency, a tone receiver connected to be normally energized in accordance with the tone modulated signals received on said one frequency, a circuit connecting the tone receiver to energize the supervisory receiving relay, said circuit also including a contact of the supervisory sending relays by the receiver, a tone transmitter connected to modulate the microwave transmitter, and a circuit including normally closed contacts of the supervisory sending relay connected to key the tone transmitter.

16. In a supervisory control system, supervisory control equipment including a normally deenergized supervisory control sending relay and a normally energized receiving relay, a reset relay operable to restore the supervisory control equipment to a normal rest condition, and a normally energized battery relay operable to effect operation of the reset relay upon return of battery voltage after a loss thereof; a microwave transmitter operating on one frequency; an audio tone transmitter connected to modulate said frequency; a keying circuit including normally closed contacts of the sending and battery relays normally energizing the tone transmitter; a microwave receiver operating on a different frequency; a tone receiver connected to be energized in response to receipt of tone code signals by the microwave receiver; and a circuit connecting the receiving relay to the tone receiver, said circuit including normally closed contacts of the sending relay.

17. Supervisory control apparatus comprising; supervisory control equipment at a dispatching office including a normally deenergized sending relay and a normally energized receiving relay respectively operable to produce and respond to coded tone signals, a reset relay operable to restore the supervisory equipment to a normal rest position, and a normally energized battery relay connected to provide an operating circuit for the reset relay upon return of battery voltage after a loss thereof; a microwave transmitter operating on one frequency; a tone transmitter connected to modulate the output frequency of the microwave transmitter; a keying circuit normally energizing the tone transmitter and including normally closed contacts of the sending relay for interrupting the keying circuit to produce coded signals; a microwave receiver operating on a different frequency; a tone receiver connected to be energized from the microwave receiver in response to receipt of coded signals; and a circuit connecting the supervisory receiving relay to be energized from the tone receiver in response to coded tone signals.

References Cited in the file of this patent
UNITED STATES PATENTS

| | | |
|---|---|---|
| 1,476,003 | Martin | Dec. 4, 1923 |
| 1,702,423 | Wensley | Feb. 19, 1929 |
| 2,289,517 | Muehter | July 14, 1942 |
| 2,300,935 | Kovalsky | Nov. 3, 1942 |
| 2,345,951 | Smith | Apr. 4, 1944 |
| 2,383,328 | Lyle | Aug. 21, 1945 |
| 2,394,971 | Baughman | Feb. 19, 1946 |
| 2,397,088 | Clay | Mar. 26, 1946 |
| 2,399,738 | Howe | May 7, 1946 |
| 2,429,131 | Lathrop | Oct. 14, 1947 |
| 2,479,701 | Ress | Aug. 23, 1949 |

OTHER REFERENCES

"Instruction Book of Radio Receiver BC–1023–A," Army Air Forces Tech. Order No. 08–10–150; cover page, and pp. 1, 4, 5, 12 and 22. (Copy in Div. 48. 317–199.)